Patented Feb. 23, 1926.

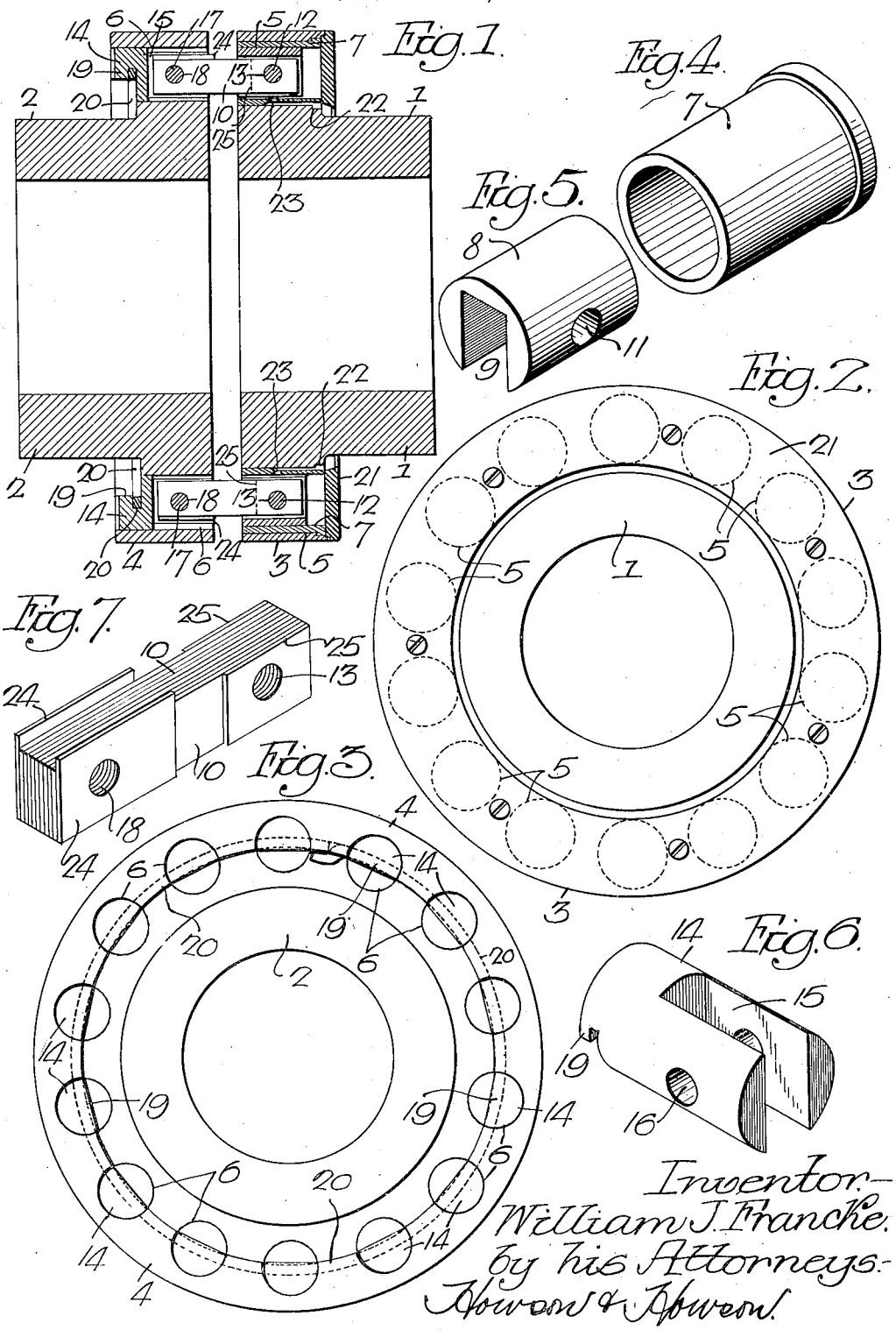

1,574,568

UNITED STATES PATENT OFFICE.

WILLIAM J. FRANCKE, OF NEW BRUNSWICK, NEW JERSEY, ASSIGNOR, BY MESNE ASSIGNMENTS, TO JOHN WALDRON CORPORATION, OF NEW BRUNSWICK, NEW JERSEY, A CORPORATION OF NEW JERSEY.

FLEXIBLE COUPLING.

Application filed June 30, 1922. Serial No. 572,019.

*To all whom it may concern:*

Be it known that I, WILLIAM J. FRANCKE, a citizen of the United States, residing in New Brunswick, New Jersey, have invented a Flexible Coupling, of which the following is a specification.

The object of this invention is to provide a flexible coupling having certain novel and improving features as hereinafter fully set forth.

In the attached drawings:

Figure 1, is a transverse section through the coupling;

Figs. 2 and 3, are elevations of the opposite end of the coupling;

Figs. 4, 5 and 6, are detached perspectives of elements of the coupling, and

Fig. 7, is a view in perspective of one of the flexible connecting members.

As illustrated in the drawings, the coupling comprises a pair of coupling members 1 and 2, adapted to be secured to the adjacent ends of the shafts which are to be coupled, each of these coupling members having a flange, 3 and 4, respectively, which are correspondingly perforated with a series of circular openings, 5 and 6 respectively. Each of the openings 5 of the member 1 is provided with a sleeve 7 which constitutes a bearing for a keeper 8, shown best in Fig. 5.

The keeper 8 is cylindrical in form, and is provided with a slot 9 for the reception of a flexible connecting member 10, which latter, as best shown in Fig. 7, is in the present instance composed of a set of rectangular steel plates or shims laid flat against each other. The slot 9 extends in the present instance the full length of the keeper 8 and inwardly from the periphery, and a central opening 11 extends through the keeper from side to side and at right angles to the plane of the slot 9 for the reception of a pin 12, which extends also through a lateral opening 13 in one end of the flexible member 10 and secures the latter in the keeper.

A second cylindrical keeper 14 is provided for the other end of the flexible member 10, this keeper also being provided with a slot 15 for the reception of the member 10, and having lateral openings 16 for the reception of a securing pin 17, which also passes through a lateral opening 18 in the end of the member 10. The keepers 14 are adapted to fit within the openings 6 of the coupling member 2, and are provided at their outer ends with a hook formation, as shown at 19, for engagement by a retaining ring 20 which is secured to the outer side of the flange 4 of the coupling member 2. By means of this arrangement, the keepers 14 are fixed in the openings 6 of the coupling member 2.

The keepers 8, however, as clearly shown in the drawings, are free to slide within the sleeves 7, and a keeper plate 21 is provided, secured to the outer side of the flange 3 of the member 2, for retaining the sleeves 7 in the openings, said plate being spaced at its inner edge slightly from the periphery of the coupling member, and there being provided in the sleeve 7 a groove 22, the inner end of which communicates through an aperture 23 with the inner surface of the sleeve, thus providing for the admission of a lubricant to the inside of the sleeve.

It will be apparent that by removal of the retaining ring 20, the connecting members with their keepers may be removed from the coupling members 1 and 2, the detachable cover plate 21 also providing for admission to the interior of the sleeves 7, and for removal of the sleeves from the openings.

Plates 25, 25, and 24, 24, are provided at the opposite ends of the flexible connecting members 10, which plates bear against the sides of the slots 9 and 15 in the keepers 8 and 14 respectively, and take on their edges the wear due to the lateral bending of the flexible members.

The coupling meets all the requirements of a device of this nature, and the arrangement places substantially all the wearing strains upon those elements which may be easily replaced and not upon the main members of the coupling. It should further be noted that the bearing surface for the movement of the flexible connectors with respect to the coupling members is a comparatively extended one by reason of the comparatively large surface area of the keeper 8 in the sleeve 7, and that by reason of this increased bearing surface, the life of the elements is greatly increased.

I claim:

1. A flexible coupling comprising relatively movable coupling members having corresponding apertures, a flexible connecting element, a keeper pivotally secured to each end of said element and adapted respectively to occupy the apertures of the said coupling members, means for securing one of the keepers to its coupling member, and a sleeve constituting a liner for the aperture of the other member detachably retained in the aperture and removable therefrom independent of the connecting element.

2. A flexible coupling comprising coupling members having therein corresponding series of circular apertures, a cylindrical keeper detachably secured in each of the apertures of one of said members, a sleeve detachably secured in each of the apertures of the other of said members, a cylindrical keeper slidably mounted in each of the sleeves and removable from the coupling member independent of the sleeve, and a flexible element pivotally secured to and connecting each of the fixed keepers with its corresponding sliding keeper.

3. A flexible coupling comprising relatively movable coupling members having corresponding apertures, a flexible connecting element, a keeper pivotally secured to each end of said element and adapted respectively to occupy the apertures of the said coupling members, means for securing one of the keepers to its coupling member, a sleeve constituting a liner for the aperture of the other member and having a channel extending from one end to the inner surface of said sleeve, and retaining means for said sleeve closing the outer end of the lined aperture while leaving uncovered the mouth of said channel.

4. A flexible coupling comprising flanged members adapted to be secured to the ends of two shafts, the flanges being correspondingly apertured, flexible connecting elements having at their opposite ends keepers adapted respectively to occupy the apertures of the said members, means for securing the keepers at one end of the elements in the apertures of one of the flanged members, sleeves constituting liners for the apertures of the other member and each having a channel extending from one end to the interior surface, and a keeper plate closing the outer ends of the lined apertures while leaving uncovered the ends of said channels.

5. In a flexible coupling, the combination with a pair of rotary coupling members, at least one of which has an axially arranged cylindrical aperture, a flexible element adapted to connect said members, and a cylindrical keeper adapted to occupy said aperture and having a slot for reception of said flexible connecting element, said slot being so arranged as to leave intact the outer cylindrical surface of that part of the keeper furthest from the axis of the said coupling member.

6. In a flexible coupling, the combination with a pair of rotary coupling members, at least one of which has an axially arranged cylindrical aperture, a flexible element adapted to connect said members, and a cylindrical keeper adapted to occupy said aperture and having a slot for reception of said flexible connecting element, said slot extending to the outer cylindrical surface of the keeper at one side only.

WILLIAM J. FRANCKE.